(12) United States Patent
Bao et al.

(10) Patent No.: US 12,511,417 B2
(45) Date of Patent: Dec. 30, 2025

(54) TAMPER-PROOF DATA PROTECTION METHOD AND SYSTEM

(71) Applicant: AISHU Technology Corp., Shanghai (CN)

(72) Inventors: Suning Bao, Shanghai (CN); Han Wang, Shanghai (CN)

(73) Assignee: AISHU Technology Corp., Shanghai (CN)

( * ) Notice: Subject to any disclaimer, the term of this patent is extended or adjusted under 35 U.S.C. 154(b) by 137 days.

(21) Appl. No.: 18/288,102

(22) PCT Filed: Feb. 20, 2023

(86) PCT No.: PCT/CN2023/077079
§ 371 (c)(1),
(2) Date: Oct. 24, 2023

(87) PCT Pub. No.: WO2024/021577
PCT Pub. Date: Feb. 1, 2024

(65) Prior Publication Data
US 2025/0086298 A1    Mar. 13, 2025

(30) Foreign Application Priority Data
Jul. 28, 2022 (CN) .......................... 202210898693.5

(51) Int. Cl.
*G06F 21/62* (2013.01)
(52) U.S. Cl.
CPC ................................ *G06F 21/6218* (2013.01)
(58) Field of Classification Search
CPC .................................................. G06F 21/6218
(Continued)

(56) References Cited

U.S. PATENT DOCUMENTS

| 7,644,271 B1 | 1/2010 | Cherepov et al. |
| 2020/0184067 A1 | 6/2020 | Kanai et al. |
| 2021/0216659 A1* | 7/2021 | Kinoshita ........... G06F 16/1727 |

FOREIGN PATENT DOCUMENTS

| CN | 102902909 A | 1/2013 |
| CN | 102855430 B * | 4/2015 |

(Continued)

OTHER PUBLICATIONS

International Search Report; Chinese Intellectual Property Office; International Application No. PCT/US2023/077079; May 25, 2023; 8 pages.

(Continued)

*Primary Examiner* — Zi Ye
(74) *Attorney, Agent, or Firm* — Taft Stettinius & Hollister LLP (57) ABSTRACT

A tamper-proof data protection method and system. The tamper-proof data protection method runs in a computer system kernel and includes the steps described below. In step 1, an access instruction for data is acquired, and the access instruction includes an access object path and access process information. In step 2, it is determined whether the access object path exists in a maintained protection path whitelist or in a subpath of a path in the protection path whitelist. If so, step 3 is executed; otherwise, a call permission signal is generated. In step 3, according to the access process information, it is determined whether the current access process exists in a maintained process whitelist. If so, a call permission signal is generated; and otherwise, an access denied signal is generated.

15 Claims, 5 Drawing Sheets

(58) Field of Classification Search
USPC .......................................................... 726/26
See application file for complete search history.

(56) References Cited

FOREIGN PATENT DOCUMENTS

| CN | 106203108 | A |   | 12/2016 |     |           |
|----|-----------|---|---|---------|-----|-----------|
| CN | 106778243 | A |   | 5/2017  |     |           |
| CN | 109460671 | A | * | 3/2019  | ... | G06F 21/6218 |
| CN | 110457920 | A |   | 11/2019 |     |           |
| CN | 110535887 | A |   | 12/2019 |     |           |
| CN | 112269644 | A |   | 1/2021  |     |           |
| CN | 114692134 | A |   | 7/2022  |     |           |
| CN | 115310084 | A |   | 11/2022 |     |           |

OTHER PUBLICATIONS

CN Office Action; National Intellectual Property Office; Chinese Patent Application No. 202210898693.5; Jun. 19, 2025; 10 pages.

\* cited by examiner

TAMPER-PROOF DATA PROTECTION METHOD AND SYSTEM

CROSS REFERENCE TO RELATED APPLICATIONS

This application is a U.S. national stage filing, filed under 35 U.S.C. 371, of International Patent Application No. PCT/CN2023/077079 filed on Feb. 20, 2023, which claims priority to Chinese Patent Application No. 202210898693.5 filed with the China National Intellectual Property Administration (CNIPA) on Jul. 28, 2022, the disclosures of which are incorporated herein by reference in their entireties.

TECHNICAL FIELD

This application relates to data protection technologies in the field of computer storage, for example, a tamper-proof data protection method and system.

BACKGROUND

With the rapid development of computer and network technologies, most enterprises are now using computers and networks to operate their core business, and the resulting data become the core asset of the enterprises. Any loss, destruction, or leakage of core data has a serious negative impact on enterprises.

Ransomware emerges endlessly and is hard to prevent. There is basically no solution for an infection with ransomware. Either ransom is paid in exchange for data, or data cannot be retrieved or are made public. The current function of detecting and killing ransomware detects and kills ransomware by identifying signature values and behaviors of the ransomware, which has limitations such as a slow update speed of a virus signature database, a low recognition rate, and false killing. Additionally, the anti-virus vendor's solution is to protect the process security of a production system and cannot be responsible for data security.

After retrieval, Chinese invention patent CN110457920A proposes a data encryption method and an encryption apparatus. The method includes the steps described below. An encryption disk is opened via a password input through a client host, and an application program accesses the data in the disk; prior to accessing, an encryption server enforces access control permission for the accessed application; stored data are encrypted and written into a storage device; the client host sends a request to close the encryption disk, and the encryption disk is closed. The method enhances the reliability and compatibility of data protection to a certain extent, but the check program for protecting the data is not comprehensive enough. In the case of a manual malicious operation or a misoperation (for example, rm-rf) that causes data on a backup system to be destroyed, the data cannot be protected by data protection solutions.

SUMMARY

The present application provides a tamper-proof data protection method and system, which can effectively protect against malicious programs such as manual sabotage and ransomware.

The present application provides a tamper-proof data protection method. The method runs in a computer system kernel and includes the steps described below.

An access instruction for data is acquired. The access instruction includes an access object path and access process information.

It is determined whether the access object path exists in a maintained protection path whitelist or in a subpath of a path in the protection path whitelist.

A call permission signal is generated in response to the access object path not existing in the maintained protection path whitelist and in the subpath of the path in the protection path whitelist. Alternatively, in response to the access object path existing in the maintained protection path whitelist or in the subpath of the path in the protection path whitelist, it is determined whether the current access process exists in a maintained process whitelist according to the access process information.

A call permission signal is generated in response to the current access process existing in the maintained process whitelist. Alternatively, an access denied signal is generated in response to the current access process not existing in the maintained process whitelist.

A method for acquiring the protection path whitelist includes the following: An absolute path of a protection object and a protection right corresponding to the absolute path are acquired, and a corresponding interface check code is generated.

The interface check code is checked, and after a successful check, a registration check code is generated.

The registration check code is checked, and after a successful check, the absolute path of the corresponding protection object is added to the protection path whitelist. The protection path whitelist is stored in the computer system kernel. Each path in the protection path whitelist has a corresponding protection right.

A method for acquiring the process whitelist includes the following:

To-be-registered process information is acquired, and a corresponding interface check code is generated.

The interface check code is checked, and after a successful check, a registration check code is generated.

The registration check code is checked, and after a successful check, the to-be-registered process information is added to the process whitelist. The process whitelist is stored in the computer system kernel.

In an implementation, the protection object includes a file, a directory, or a device.

In an implementation, if the protection object is the file or the directory, the method for acquiring the protection path whitelist also includes acquiring a corresponding partition and disk information in a case of the successful check of the registration check code.

In an implementation, the process information includes a process identification (PID) and a process name.

In an implementation, the interface check code and the registration check code are generated by using a security socket layer (SSL) encryption authentication method, or the interface check code is checked by using an SSL encryption authentication method.

The present application also provides a tamper-proof data protection system. The system includes a configuration module, a parameter check module, a user-mode interaction module, and a system call check drive module.

The system call check drive module is configured to acquire an access instruction for data, where the access instruction includes an access object path and access process information; determine whether the access object path exists in a maintained protection path whitelist or in a subpath of a path in the protection path whitelist; determine, according to the access process information, whether the current access process exists in a maintained process whitelist in response to the access object path existing in the maintained protection path whitelist or in the subpath of the path in the protection path whitelist; generate a call permission signal in response to the current access process existing in the maintained process whitelist or generate an access denied signal in response to the current access process not existing in the maintained process whitelist.

The protection path whitelist and the process whitelist are acquired by the cooperation of the configuration module, the parameter check module, the user-mode interaction module, and the system call check drive module.

The configuration module is configured to acquire an absolute path of a protection object and a corresponding protection right, call the parameter check module to generate a corresponding interface check code, and transmit the absolute path and the interface check code to the user-mode interaction module. The user-mode interaction module is configured to call the parameter check module to check the interface check code, and after a successful check, call the parameter check module to generate a registration check code, and transmit the absolute path and the registration check code to the system call check drive module. The system call check drive module is also configured to check the registration check code, and after a successful check, add the absolute path of the corresponding protection object to the protection path whitelist. Each path in the protection path whitelist has a corresponding protection right.

The parameter check module is configured to be called by a to-be-registered user-mode program to generate a corresponding interface check code. The user-mode interaction module is also configured to receive process information of the to-be-registered user-mode program and the interface check code. The user-mode interaction module is also configured to call the parameter check module to check the interface check code, and after a successful check, call the parameter check module to generate a registration check code, and transmit the process information and the registration check code to the system call check drive module. The system call check drive module is also configured to check the registration check code, and after a successful check, add the to-be-registered process information to the process whitelist.

The system call check drive module is built in a computer system kernel.

In an implementation, the protection object includes a file, a directory, or a device.

In an implementation, the protection object is the file or the directory, and in the process of acquiring the protection path whitelist, the user-mode interaction module is also configured to acquire a corresponding partition and disk information after the generated registration check code is checked successfully.

In an implementation, the process information includes a PID and a process name.

In an implementation, the configuration module and the user-mode interaction module are configured to call the parameter check module through an SSL encryption authentication method.

The present application also provides an electronic device including at least one processor and a memory.

The memory is in a communication connection with the at least one processor.

The memory stores a computer program executable by the at least one processor, and the computer program is configured to, when executed by the at least one processor, cause the at least one processor to execute the preceding tamper-proof data protection method.

The present application also provides a computer-readable storage medium storing computer instructions which, when executed by a processor, implement the preceding tamper-proof data protection method.

DETAILED DESCRIPTION

The present application is described below in conjunction with drawings and specific embodiments. This embodiment is implemented based on the technical schemes of the present application, and the implementation and operation procedures are given.

The present application provides a tamper-proof data protection method. The method runs in a computer system kernel and includes the steps described below. In step 1, an access instruction for data is acquired, and the access instruction includes an access object path and access process information. In step 2, it is determined whether the access object path exists in a maintained protection path whitelist or in a subpath of a path in the protection path whitelist. If the access object path exists in the maintained protection path whitelist or in the subpath of the path of the protection path whitelist, step 3 is executed. If the access object path does not exist in the maintained protection path whitelist and in the subpath of the path in the protection path whitelist, a call permission signal is generated. In step 3, according to the access process information, it is determined whether the current access process exists in a maintained process whitelist. A call permission signal is generated if it is determined according to the access process information that the current access process exists in the maintained process whitelist. Alternatively, an access denied signal is generated if it is determined that the current access process does not exist in the maintained process whitelist according to the access process information. That is, in this method, if the transferred path of the file is not in the protection range, or the current process is in the process whitelist, calling of a real system function by the current access process is allowed. The protection path whitelist and the process whitelist may be dynamically maintained.

In the preceding method, both the protection path whitelist and the process whitelist are acquired in a check-code manner. The protection path whitelist is acquired by the following steps: An absolute path of a protection object and a protection right corresponding to the absolute path are acquired, and a corresponding interface check code is generated. The interface check code is checked, and after the interface check code is checked successfully, a registration check code is generated. The registration check code is checked, and after the registration check code is checked successfully, the absolute path of the protection object is added to the protection path whitelist. The protection path whitelist is stored in the computer system kernel. Each path in the protection path whitelist has its corresponding protection right. The process whitelist is acquired by the following steps: To-be-registered process information is acquired, and a corresponding interface check code is generated. The interface check code is checked, and after the interface check code is checked successfully, a registration check code is generated. The registration check code is checked, and after the registration check code is checked successfully, the to-be-registered process information is added to the process whitelist. The process whitelist is stored in the computer system kernel.

Figure 1:
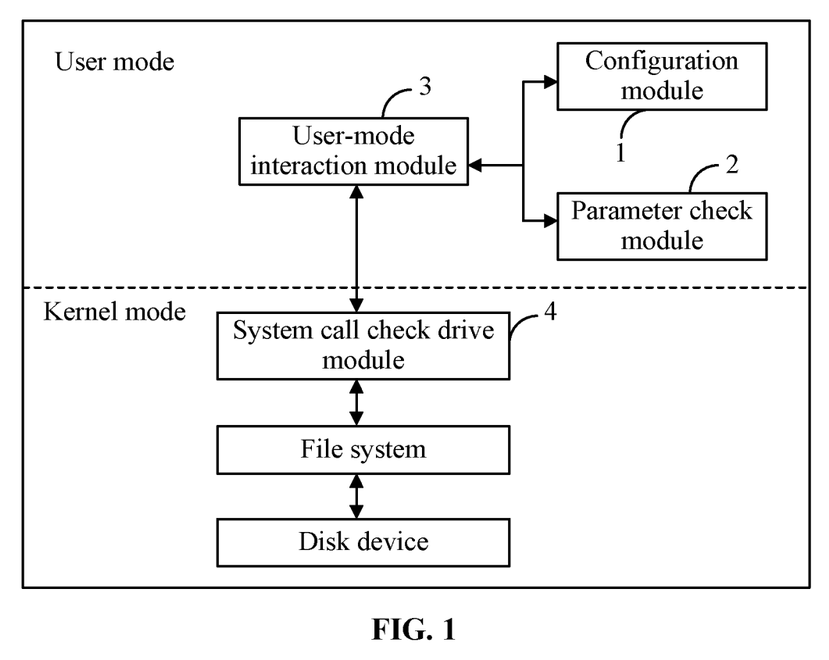
FIG. 1 is a diagram illustrating the structure of a system according to an embodiment of the present application.

In an embodiment, the preceding methods may be implemented by a tamper-proof data protection system as shown in FIG. 1. The system includes a configuration module 1 of a user-mode, a parameter check module 2 of the user-mode, a user-mode interaction module 3, and a system call check drive module 4 belonging to the kernel-mode. A protection path whitelist registration flow, a process whitelist registration flow, and a system call validity detection flow are implemented by the cooperation of multiple modules.

Figure 2:
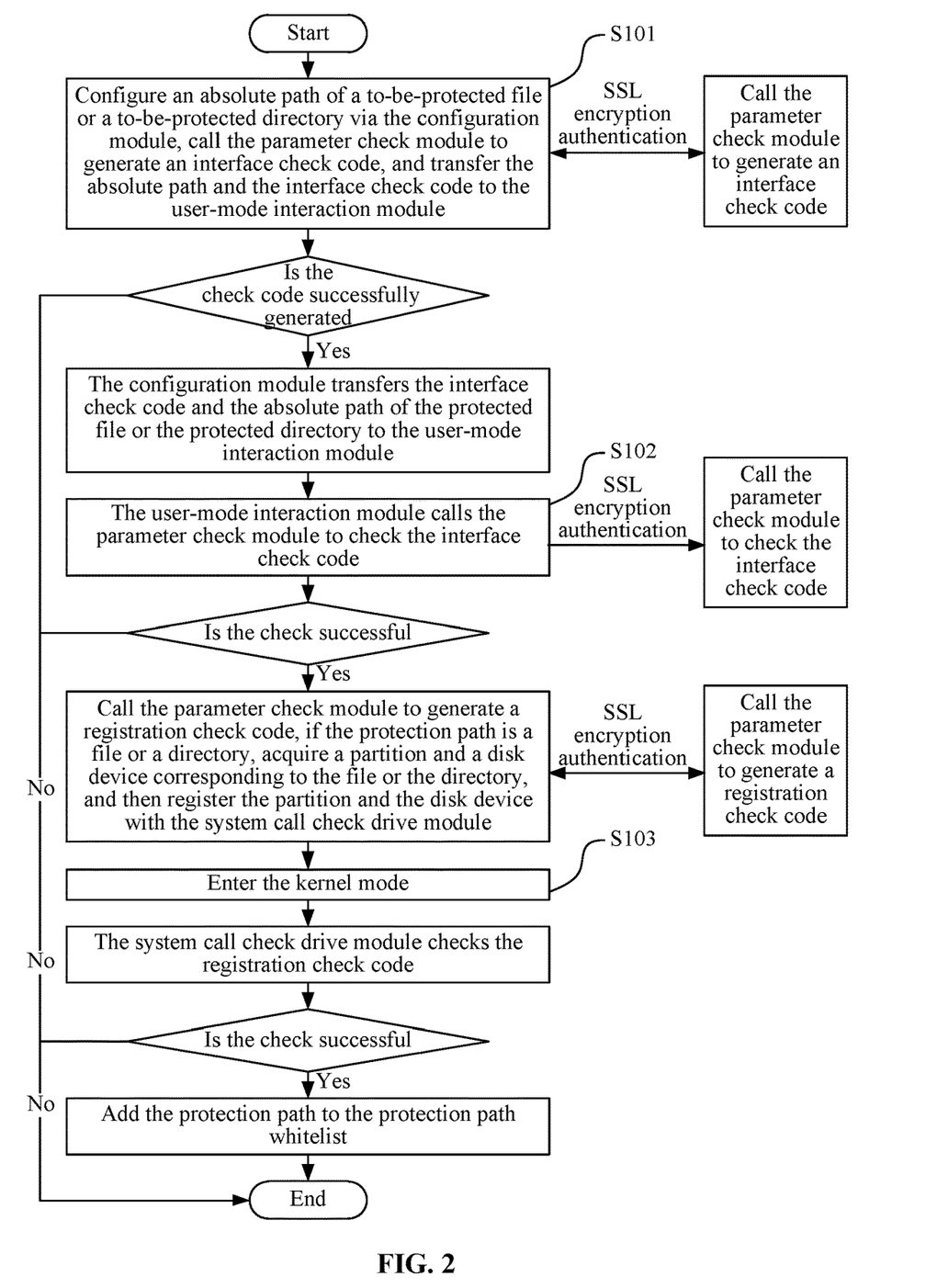
FIG. 2 is a flowchart of registering a protection path whitelist according to an embodiment of the present application.

As shown in FIG. 2, the protection path whitelist registration flow includes the steps described below.

In S101, an absolute path of a to-be-protected file, a to-be-protected directory, or a to-be-protected device is transferred to the configuration module, the parameter check module is called by the configuration module to generate an interface check code, and if the interface check code is successfully generated, the protected absolute path and the interface check code are transferred to the user-mode interaction module.

In S102, the parameter check module is called by the user-mode interaction module to check the interface check code, and after a successful check, the parameter check module is called to generate a registration check code, and if the registration check code is successfully generated, the protected absolute path and the registration check code are registered with the system call check drive module.

In S103, the kernel mode is entered, after the registration information is received by the system call check drive module, the registration check code is checked first, and after a successful check, the related protection path is added to the protection path whitelist.

Figure 3:
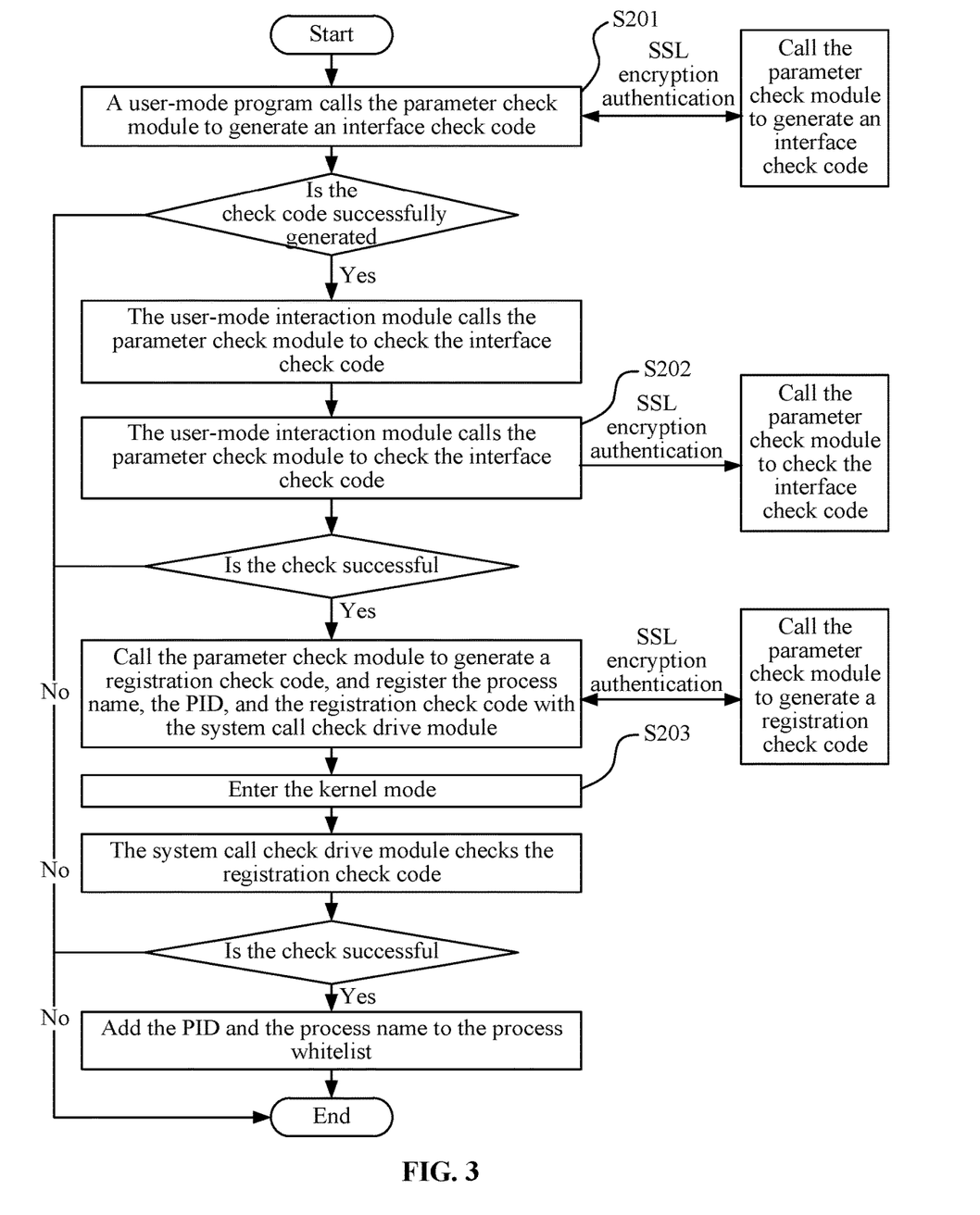
FIG. 3 is a flowchart of registering a process whitelist according to an embodiment of the present application.

As shown in FIG. 3, the process whitelist registration flow includes the steps described below.

In S201, the parameter check module is called by a user-mode program to generate an interface check code, and if the interface check code is successfully generated, a PID, a process name, and the interface check code are transferred to the user-mode interaction module.

In S202, the parameter check module is called by the user-mode interaction module to check the interface check code, after a successful check, the parameter check module is called to generate a registration check code, and if the registration check code is successfully generated, the PID, the process name, and the registration check code are registered with the system call check drive module.

In S203, the kernel mode is entered, after the registration information is received by the system call check drive module, the registration check code is checked first, and after a successful check, the related PID and process name are added to the process whitelist.

Figure 4:
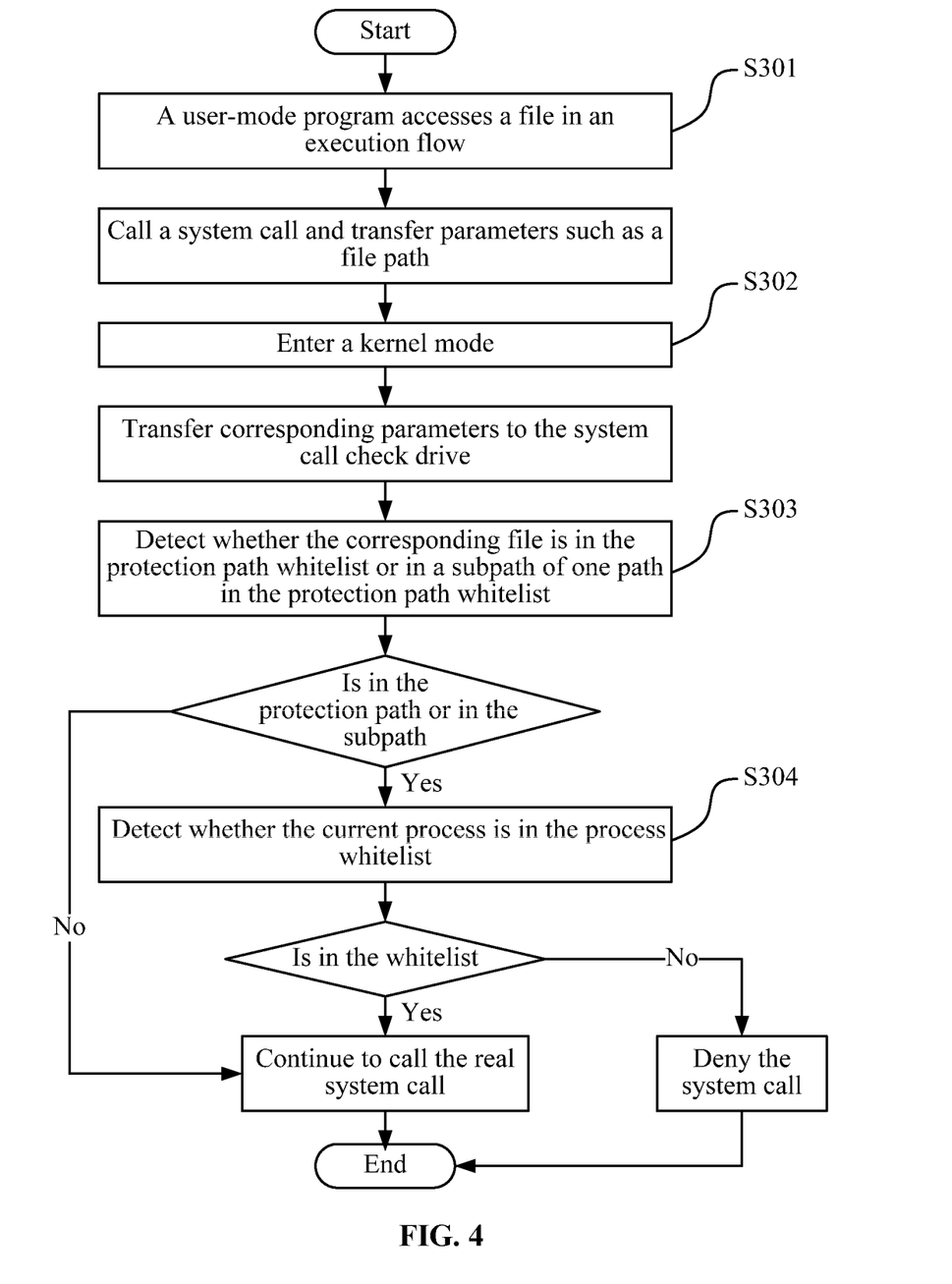
FIG. 4 is a flowchart of a tamper-proof data access according to an embodiment of the present application.

As shown in FIG. 4, the system call validity detection flow includes the steps described below.

In S301, when a user-mode program accesses a file, a system call provided by an operating system is called by the user-mode program.

In S302, the kernel mode is entered, the path, the PID and other information of the file are transferred to a system kernel. The preceding information is first transferred to the system call check drive module.

In S303, it is detected by the system call check drive module whether the transferred path of the file is in the protection path list or a subpath of the protection path list, if the transferred path of the file is in the protection path list or the subpath of the protection path list, step 304 is executed; and if the transferred path of the file is not in the protection path list and the subpath of the protection path list, calling of a real system function by the current process is allowed.

In S304, it is detected whether a PID and a process name of the current access process are in the process whitelist, if the PID and the process name of the current access process are not in the process whitelist, a system call is denied, and an error code is directly returned to the user-mode program; and if the current access process is in the process whitelist, calling of the real system functions by the current access process is allowed.

The preceding interface check code represents that the user-mode interaction module provides an access interface for the external, an application program needs to transmit an interface check code when calling the interface, the interface check code may be generated by the parameter check module, and after receiving the interface check code, the user-mode interaction module calls the parameter check module to check validity of the check code to prevent an unauthorized illegal program from calling the function of the interaction module.

The preceding registration check code represents that when registering with the driver, the user-mode interaction module calls the parameter check module to generate a registration check code, the registration check code is transferred to the system call check drive module together with other parameters, after receiving the registration check code, the drive module performs a check, and after a successful check, the drive module may confirm that the registration is legal.

This registration check code prevents an unauthorized illegal program from registering information with the system call check drive module.

The preceding protection right refers to an access right of an application program to a protection path and may be divided into a read right and a write right. When only the write right is configured, only a process in the process whitelist has the right to perform a write operation on the path, and all processes have the right to perform a read operation on the path. The read right is similar.

In the preceding procedure, the configuration module and the user-mode interaction module call the parameter check module through an SSL encryption authentication method to prevent an illegal program call. The SSL authentication encryption refers to a widely-used client/server encryption authentication technology and belongs to a public authentication encryption technology.

The preceding parameter check module generating a check code indicates that the parameter check module generates a corresponding check code according to a parameter (such as a PID and a process name) transmitted from an external program by using message-digest algorithm 5

(MD5), and when the parameter is transferred, the SSL authentication encryption is adopted to prevent access of an illegal program.

The preceding system call refers to a basic operation function provided by the operating system kernel to user space. The system call is a general concept. A user-mode program accesses corresponding system resources by entering kernel space via the system call.

When the preceding system is used, the system call check drive module, the user-mode interaction module, the configuration module, and the parameter check module are installed on a machine that needs to be tamper-proof, and a to-be-protected file, a to-be-protected directory, and a to-be-protected device are registered with the system call check drive module via the configuration module. Relevant user-mode processes in the system are transformed. When these processes are started, the PID and the process name of the processes are registered with the system call check drive module. When a program needs to access a file, the program enters the kernel via a system call. Before a real system function is called, the system call check drive module determines whether the file accessed by the system call is in the protection path list. If the file accessed by the system call is in the protection path list, the system call check drive module further checks whether the current process is in the process whitelist. If the current process is in the process whitelist, the corresponding file resource may be accessed. If the current process is not in the process whitelist, the system call check drive module directly denies the access. In this manner, the purpose of data tamper-proof is achieved.

In an embodiment, in a device where the preceding tamper-proof data protection system is installed, the protection flow is as follows if ransomware or other malicious programs occur: When the ransomware or other malicious processes search for, encrypt, delete, or destroy a file in the computer system, the ransomware or other malicious processes may enter the kernel via a system call. The system call check drive module first checks the ransomware or other malicious processes and finds that the PID and the process name of the current process are not in the process whitelist. Therefore, the system call check drive module directly denies the access operation. Therefore, these malicious programs cannot access the protected files, directories, or devices and thus cannot destroy, encrypt, or leak data of the computer system.

In an embodiment, in a device where the preceding tamper-proof data protection system is installed, the protection flow is as follows if a manual malicious operation or a misoperation occurs: A manual operation is generally performed directly from a background server to delete or destroy data on a computer system, such as an rm-rf operation. In the process of performing such operation, it is also necessary to enter the kernel via a system call. After the kernel is entered, the system call check drive module first checks the operation and finds that the PID and the process name of the current process are not in the process whitelist. Therefore, the system call check drive module directly denies the access operation. Therefore, the manual malicious operation or misoperation cannot access the protected files, directories, or devices and thus cannot destroy, encrypt, or leak data of the computer system.

Compared with the related art, the present application has the effects described below.

1. According to the present application, accurate and efficient protection of a file can be achieved through double verification of a path and process and a built-in system call check drive, and killing of malicious programs is not missed. Moreover, installation and configuration are required only once, and no update operation is required subsequently.
2. The SSL encryption authentication method is adopted in the present application to generate a verification check code, featuring high reliability.
3. The present application may be applied to a variety of situations such as ransomware, other malicious or manual malicious operations, or misoperations. When searching for, encrypting, deleting, and destroying a file in the computer system, the ransomware or other malicious process cannot legally register the PID and process name of the ransomware or other malicious process with the system call check drive module of the kernel mode so that the ransomware or other malicious process cannot access the protected files, directories, or devices and thus cannot destroy, encrypt, or leak data in the computer system. In a manual operation, an operation is mainly performed on a control line. A shell process and a corresponding control process cannot be legally registered with the system call check drive module of the kernel mode when the operation is performed on the control line. Therefore, no right is provided for accessing the protected files, directories, and devices, thereby preventing a manual malicious operation or a misoperation.

Figure 5:
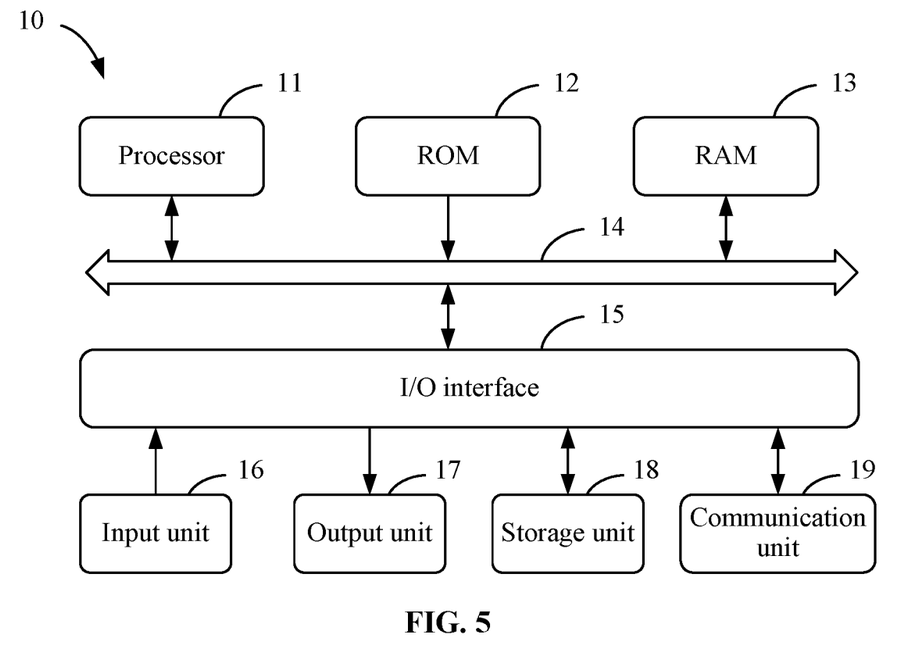
FIG. 5 is a diagram illustrating the structure of an electronic device according to an embodiment of the present application.

FIG. 5 is a diagram illustrating the structure of an electronic device 10 that may implement embodiments of the present application. The electronic device 10 is intended to represent multiple forms of digital computers, for example, a laptop computer, a desktop computer, a worktable, a personal digital assistant, a server, a blade server, a mainframe computer, or other applicable computers. The electronic device 10 may also represent multiple forms of mobile apparatuses such as a personal digital processing apparatus, a cellular phone, a smart phone, a wearable device (for example, a helmet, glasses, a watch), and other similar computing apparatuses. The components shown herein, their connections and relationships, and their functions, are by way of examples only and are not intended to limit implementations of the application described and/or claimed herein.

As shown in FIG. 5, the electronic device 10 includes at least one processor 11 and a memory such as a read-only memory (ROM) 12 and a random-access memory (RAM) 13. The memory is in a communication connection with the at least one processor 11. The memory stores a computer program executable by the at least one processor. The processor 11 may perform various appropriate actions and processes according to computer programs stored in the ROM 12 or loaded from a storage unit 18 into the RAM 13. The RAM 13 may also store multiple programs and data required for the operation of the electronic device 10. The processor 11, the ROM 12, and the RAM 13 are connected to each other via a bus 14. An input/output (I/O) interface 15 is also connected to the bus 14.

Multiple components in the electronic device 10 are connected to the I/O interface 15, including an input unit 16, such as a keyboard or a mouse; an output unit 17, such as multiple types of displays or speakers; a storage unit 18, such as a magnetic disk or an optical disk; and a communication unit 19, such as a network card, a modem, or a wireless communication transceiver. The communication unit 19 allows the electronic device 10 to exchange information/data with other devices through a computer network such as the Internet and/or multiple telecommunication networks.

The processor 11 may be multiple general-purpose and/or special-purpose processing components having processing and computing capabilities. Some examples of the processor 11 include, but are not limited to, a central processing unit (CPU), a graphics processing unit (GPU), multiple dedicated artificial intelligence (AI) computing chips, multiple processors running machine learning model algorithms, a digital signal processor (DSP), and any suitable processors, controllers, and microcontrollers. The processor 11 performs multiple methods and processing described above, such as the tamper-proof data protection method.

In some embodiments, the tamper-proof data protection method may be implemented as a computer program tangibly embodied in a computer-readable storage medium such as the storage unit 18. In some embodiments, part or all of the computer program may be loaded and/or installed on the electronic device 10 via the ROM 12 and/or the communication unit 19. When the computer program is loaded into the RAM 13 and executed by the processor 11, one or more steps of the tamper-proof data protection method described above may be performed. Alternatively, in other embodiments, the processor 11 may be configured to perform the tamper-proof data protection method by any other suitable means (for example, by means of firmware).

Multiple implementations of the systems and technologies described above herein may be implemented in digital electronic circuitry, integrated circuitry, a field programmable gate array (FPGA), an application specific integrated circuit (ASIC), an application specific standard product (ASSP), a system on chip (SOC), a complex programmable logic device (CPLD), a computer hardware, a firmware, a software, and/or combinations thereof. The multiple implementations may include an implementation in one or more computer programs that may be executable and/or interpretable on a programmable system including at least one programmable processor. The programmable processor may be special-purpose or general-purpose for receiving data and instructions from a memory system, at least one input apparatus, and at least one output apparatus and transmitting the data and instructions to the memory system, the at least one input apparatus, and the at least one output apparatus.

The computer program for implementing the method of the present application may be written in any combination of one or more programming languages. These computer programs may be provided to a processor of a general-purpose computer, special-purpose computer, or other programmable data processing apparatuses such that the computer programs, when executed by the processor, cause the functions/operations specified in flowcharts and/or block diagrams to be implemented. The computer program may be executed entirely or partly on the machine, as a stand-alone software package partly on the machine and partly on a remote machine, or entirely on the remote machine or server.

In the context of the present application, a computer-readable storage medium may be a tangible medium that may contain or store a computer program for use by or in conjunction with an instruction execution system, apparatus, or device. The computer-readable storage medium may include, but is not limited to, electronic, magnetic, optical, electromagnetic, infrared, or semiconductor systems, apparatuses, or devices, or any suitable combination thereof. Alternatively, the computer-readable storage medium may be a machine-readable signal medium. Examples of the machine-readable signal medium may include an electrical connection based on one or more wires, a portable computer disk, a hard disk, a RAM, a ROM, an erasable programmable read-only memory (EEPROM or flash memory), an optical fiber, a compact disc read-only memory (CD-ROM), an optical storage device, a magnetic storage device, or any appropriate combination thereof.

To provide interaction with a user, the systems and technologies described herein may be implemented on an electronic device. The electronic device has a display device (for example, a cathode ray tube (CRT) or a liquid crystal display (LCD) monitor) configured to display information to the user; and a keyboard and pointing apparatus (for example, a mouse or a trackball), through which a user may provide an input to the electronic device. Other types of apparatuses may also be configured to be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and technologies described herein may be implemented in a computing system including a back-end component (for example, a data server), a computing system including a middleware component (for example, an application server), a computing system including a front-end component (for example, a client computer having a graphical user interface or a web browser through which a user may interact with implementations of the systems and technologies described herein), or a computing system including any combination of such back-end, middleware, or front-end components. Components of a system may be interconnected by any form or medium of digital data communication (for example, a communication network). Examples of communication networks include a local area network (LAN), a wide area network (WAN), a blockchain network, and the Internet.

The computing system may include a client and a server. A client and a server are generally remote from each other and typically interact through a communication network. The relationship between the client and the server arises by virtue of computer programs running on respective computers and having a client-server relationship to each other. The server, which may be a cloud server and is also referred to as a cloud computing server or a cloud host, is a host product in a cloud computing service system. The server solves the problems of difficult management and weak service scalability in the service of a traditional physical host and a virtual private server (VPS).

Multiple forms of flows shown above may be adopted with steps reordered, added, or deleted. For example, the steps described in the present application may be performed in parallel, sequentially, or in different orders, as long as the desired results of the technical solutions of the present application can be achieved, and no limitation is imposed herein.

What is claimed is:

1. A tamper-proof data protection method, running in a computer system kernel and comprising:
   acquiring an access instruction for data, wherein the access instruction comprises an access object path and access process information;
   determining whether the access object path exists in a maintained protection path whitelist or in a subpath of a path in a maintained protection path whitelist;
   in response to the access object path not existing in the maintained protection path whitelist and in the subpath of the path in the maintained protection path whitelist, generating a call permission signal; or in response to the access object path existing in the maintained protection path whitelist or in the subpath of the path in the maintained protection path whitelist, determining, according to the access process information, whether a current access process exists in a maintained process whitelist; and in response to the current access process existing in the maintained process whitelist, generating a call permission signal; or in response to the current access process not existing in the maintained process whitelist, generating an access denied signal;

wherein a method for acquiring the protection path whitelist comprises:

acquiring an absolute path of a protection object and a protection right corresponding to the absolute path, and generating a corresponding interface check code;

checking the interface check code, and after a successful check of the interface check code, generating a registration check code; and checking the registration check code, and after a successful check of the registration check code, adding the absolute path of the protection object to the protection path whitelist, wherein the protection path whitelist is stored in the computer system kernel, and each path in the protection path whitelist has a corresponding protection right; and wherein a method for acquiring the process whitelist comprises:

acquiring to-be-registered process information, and generating a corresponding interface check code;

checking the interface check code, and after a successful check of the interface check code, generating a registration check code; and checking the registration check code, and after a successful check of the registration check code, adding the to-be-registered process information to the process whitelist, wherein the process whitelist is stored in the computer system kernel.

2. The tamper-proof data protection method of claim 1, wherein the protection object comprises a file, a directory, or a device.

3. The tamper-proof data protection method of claim 2, wherein in a case where the protection object is the file or the directory, the method for acquiring the protection path whitelist further comprises:

in a case where the registration check code is successfully checked, acquiring a corresponding partition and disk information.

4. The tamper-proof data protection method of claim 1, wherein the process information comprises a process identification (PID) and a process name.

5. The tamper-proof data protection method of claim 1, wherein the interface check code and the registration check code are generated by using a security socket layer (SSL) encryption authentication method, or the interface check code is checked by using an SSL encryption authentication method.

6. An electronic device, comprising:
at least one processor; and
a memory communicatively connected to the at least one processor; wherein
the memory stores a computer program executable by the at least one processor, and the computer program, when executed by the at least one processor, causes the at least one processor to execute the following:
acquiring an access instruction for data, wherein the access instruction comprises an access object path and access process information;

determining whether the access object path exists in a maintained protection path whitelist or in a subpath of a path in a maintained protection path whitelist;

in response to the access object path not existing in the maintained protection path whitelist and in the subpath of the path in the maintained protection path whitelist, generating a call permission signal; or in response to the access object path existing in the maintained protection path whitelist or in the subpath of the path in the maintained protection path whitelist, determining, according to the access process information, whether a current access process exists in a maintained process whitelist; and in response to the current access process existing in the maintained process whitelist, generating a call permission signal; or in response to the current access process not existing in the maintained process whitelist, generating an access denied signal;

wherein a method for acquiring the protection path whitelist comprises:

acquiring an absolute path of a protection object and a protection right corresponding to the absolute path, and generating a corresponding interface check code;

checking the interface check code, and after a successful check of the interface check code, generating a registration check code; and checking the registration check code, and after a successful check of the registration check code, adding the absolute path of the protection object to the protection path whitelist, wherein the protection path whitelist is stored in the computer system kernel, and each path in the protection path whitelist has a corresponding protection right; and wherein a method for acquiring the process whitelist comprises:

acquiring to-be-registered process information, and generating a corresponding interface check code;

checking the interface check code, and after a successful check of the interface check code, generating a registration check code; and checking the registration check code, and after a successful check of the registration check code, adding the to-be-registered process information to the process whitelist, wherein the process whitelist is stored in the computer system kernel.

7. The electronic device of claim 6, wherein the protection object comprises a file, a directory, or a device.

8. The electronic device of claim 7, wherein in a case where the protection object is the file or the directory, the method for acquiring the protection path whitelist further comprises:

in a case where the registration check code is successfully checked, acquiring a corresponding partition and disk information.

9. The electronic device of claim 6, wherein the process information comprises a process identification (PID) and a process name.

10. The electronic device of claim 6, wherein the interface check code and the registration check code are generated by using a security socket layer (SSL) encryption authentication method, or the interface check code is checked by using an SSL encryption authentication method.

11. A non-transitory computer-readable storage medium storing computer instructions which, when executed by a processor, implement the tamper-proof data protection method of claim 1.

12. A non-transitory computer-readable storage medium storing computer instructions which, when executed by a processor, implement the tamper-proof data protection method of claim 2.

13. A non-transitory computer-readable storage medium storing computer instructions which, when executed by a processor, implement the tamper-proof data protection method of claim 3.

14. A non-transitory computer-readable storage medium storing computer instructions which, when executed by a processor, implement the tamper-proof data protection method of claim 4.

15. A non-transitory computer-readable storage medium storing computer instructions which, when executed by a processor, implement the tamper-proof data protection method of claim 5.

* * * * *